United States Patent [19]

Kajikawa et al.

[11] Patent Number: 4,626,226

[45] Date of Patent: * Dec. 2, 1986

[54] TORQUE FLUCTUATION DAMPER

[75] Inventors: Masauemon Kajikawa; Hiroyuki Kitajima; Tatsuo Kato, all of Komatsu, Japan

[73] Assignee: Kabushiki Kaisha Komatsu Seisakusho, Tokyo, Japan

[*] Notice: The portion of the term of this patent subsequent to Mar. 2, 2001 has been disclaimed.

[21] Appl. No.: 169,319

[22] Filed: Jul. 16, 1980

[51] Int. Cl.$^4$ ............................................. F16D 3/14
[52] U.S. Cl. ............................ 464/64; 192/106.2; 192/107 R; 192/113 B; 464/68
[58] Field of Search ............... 192/106.2, 70.17, 70.18, 192/70.14, 70.12, 107 R, 113 B, 106.1; 64/27 C, 27 F; 464/46, 64, 68

[56] References Cited

U.S. PATENT DOCUMENTS

| | | | |
|---|---|---|---|
| 2,314,948 | 3/1943 | Nutt | 192/106.2 |
| 3,253,686 | 5/1966 | Scheurer | 192/107 R X |
| 3,931,876 | 1/1976 | Beeskow et al. | 192/106.2 |
| 3,982,611 | 9/1976 | Gannon | 192/107 R X |
| 4,027,758 | 6/1977 | Gustavsson et al. | 192/113 B |
| 4,113,067 | 9/1978 | Coons et al. | 192/113 B X |

FOREIGN PATENT DOCUMENTS

| | | | |
|---|---|---|---|
| 691887 | 8/1964 | Canada | 192/106.2 |
| 2325711 | 12/1973 | Fed. Rep. of Germany | 192/106.2 |
| 853313 | 11/1960 | United Kingdom | 192/107 |
| 1392788 | 4/1975 | United Kingdom | 192/106.2 |
| 1428557 | 3/1976 | United Kingdom | 192/106.2 |

Primary Examiner—Rodney H. Bonck
Attorney, Agent, or Firm—Armstrong, Nikaido, Marmelstein & Kubovcik

[57] ABSTRACT

A device to be connected between the engine and power train of a construction vehicle or the like for damping the fluctuations of the engine output torque. The damper comprises a drive plate and a retaining plate coaxially connected to each other for simultaneous rotation, and a driven plate coaxially mounted between the drive and retaining plates for angular displacement within limits. Mounted between the retaining plate and the driven plate are a friction plate and a disc spring, with the friction plate being biased by the disc spring into frictional contact with the driven plate. The friction plate has a conical contact surface which, under the bias of the disc spring, makes frictional contact with the driven plate under even pressure. Two other friction plates lie between the drive and driven plates and make frictional contact with the driven plate and with an intermediate plate in positive engagement with the driven plate. A plurality of springs act between the drive and retaining plates and the driven plate for absorbing torque fluctuations when a slip occurs therebetween.

8 Claims, 7 Drawing Figures

TORQUE FLUCTUATION DAMPER

BACKGROUND OF THE INVENTION

Our invention pertains to a device to be interposed between an internal combustion engine and a power train, as of off-highway vehicles, for damping the output torque fluctuations of the engine and preventing resonance in the power train.

The transmission of engine output torque to the power train through a damper of the type under consideration has been common with industrial and construction vehicles. The damper of typical known construction comprises a drive plate and a retaining plate rigidly connected to each other and to the flywheel of a vehicle engine for simultaneous rotation therewith, and a driven plate mounted between the drive and retaining plates and connected to the vehicle power train. A spring-loaded friction plate lies between the retaining and driven plates, and another friction plate lies between the drive and driven plates, for frictionally transmitting the engine torque from the drive to the driven plate. A slip occurs between the drive and driven plates upon engine torque fluctuation, resulting in the compression of torsional springs mounted therebetween for absorbing torque fluctuations.

An objection to the prior art damper concerns its spring-loaded friction plate. This friction plate has a planar contact surface held against the driven plate under the bias of a disc spring. Since the disc spring acts on the center portion of the friction plate, however, its contact surface makes frictional engagement with the driven plate under uneven pressure, the peripheral portion of the contact surface receiving significantly less spring pressure than does its central portion. This results in decrease in hysteresis torque (friction torque) and in uneven wear of the friction plate.

Another objection is directed to the second mentioned friction plate, which is urged by the drive plate into frictional contact with the driven plate. The second friction plate has a relatively small area of contact with the driven plate. The damper will have a higher torque fluctuation absorbing ability if the frictional contact area is increased.

SUMMARY OF THE INVENTION

Our invention aims at improvement of the torque fluctuation absorbing ability of the damper in question through increase of the effective frictional contact area between its driving and driven members. The invention also seeks to prevent the premature or uneven wear of the contact surfaces of the damper.

In brief the damper of our invention comprises a drive plate to be connected to and driven by an internal combustion engine, a retaining plate coaxially connected to the drive plate for simultaneous rotation therewith, and a driven plate which is to be connected to a power train and which is coaxially mounted between the drive and retaining plates for angular displacement within limits. Coaxially mounted between the retaining and driven plates, a friction plate has a conical contact surface held against the driven plate, in such a way that the entire contact surface of the friction plate makes uniform frictional contact with the driven plate.

The conical contact surface of the friction plate may be either concave or convex in the absence of the biasing force of the disc spring. However, the disc spring should act centrally on the friction plate if its contact surface is concave, and peripherally on the friction plate if its contact surface is convex. Either way, the contact surface of the friction plate will not suffer uneven wear and, making uniform frictional contact with the driven plate, will help to improve the performance of the damper.

A further feature of our invention resides in two other friction plates coaxially mounted between the drive and driven plates, with an intermediate plate disposed between the two friction plates and held in positive engagement with the driven plate. One of the two other friction plates has a contact surface in frictional contact with the intermediate plate, and the other friction plate has a pair of opposite contact surfaces in frictional contact with the intermediate and driven plates. Thus the total of three friction plates make frictional contact with the opposite surfaces of the driven plate and of the intermediate plate, contributing to the desired high torque absorbing ability of the damper in accordance with our invention.

According to a still further feature of our invention the contact surfaces of all the three friction plates have lubricant grooves formed therein. The lubrication of the contact surfaces will serve to extend the useful life of the friction plates and of the damper itself.

The above and other objects, features and advantages of our invention will become more apparent, and the invention itself will best be understood, from a study of the following description of preferred embodiments, taken in connection with the attached drawings.

DESCRIPTION OF THE PREFERRED EMBODIMENTS

Figure 1:
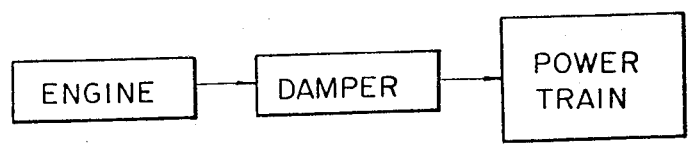
FIG. 1 is a block diagram explanatory of the mode of use of the torque fluctuation damper in accordance with our invention.
Figure 2:
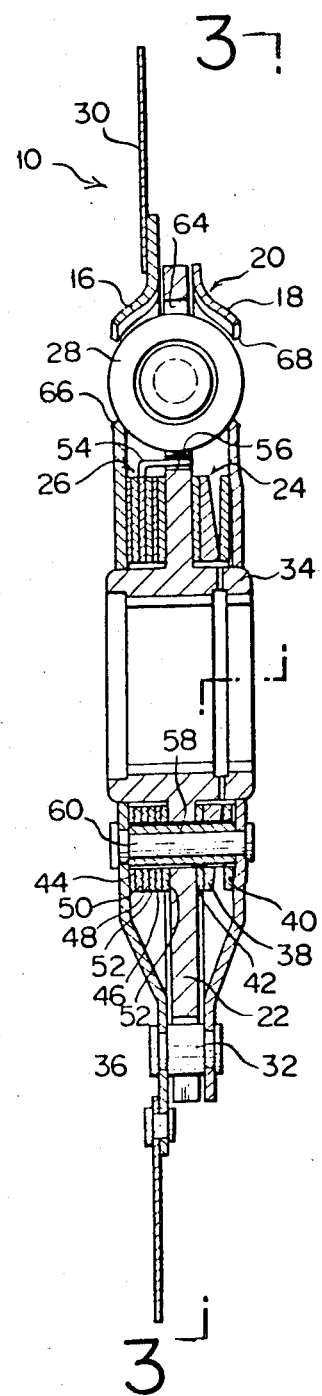
FIG. 2 is an axial sectional view of the damper constructed in accordance with our invention.
Figure 3:
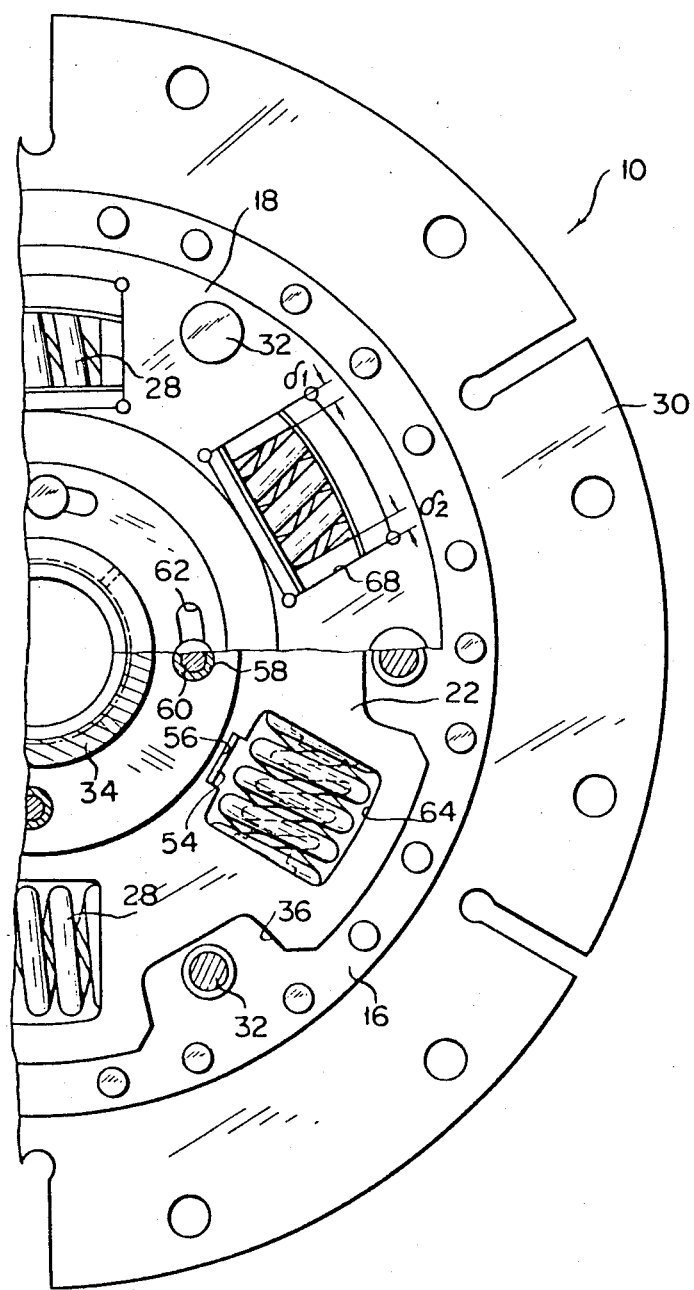
FIG. 3 is a partial, half elevational and half sectional view of the damper, with the section being taken along the line 3—3 of FIG. 2.

We will now describe the torque fluctuation damper of our invention as adapted for use on industrial or construction vehicles. As will be seen from FIG. 1, the damper 10 in accordance with our invention is to be interposed between the internal combustion engine 12 and power train 14 of a vehicle, for absorbing the output torque fluctuations of the engine and preventing resonance in the power train. With reference now directed to FIGS. 2 and 3 the damper 10 broadly comprises:

1. A drive plate 16 to be connected to and rotated by the vehicle engine 12.

2. A retaining plate 18 rigidly and coaxially connected to the drive plate 16 for simultaneous rotation therewith.

3. A driven plate 20 coaxially mounted between the drive 16 and retaining 18 plates for angular displacement relative to same within limits, the driven plate having a hub 22 for connection to the vehicle power train 14.

4. A first friction plate 24 coaxially mounted between the retaining 18 and driven 20 plates and biased by a disc spring 26 into frictional contact with the driven plate for transmitting the rotation of the drive plate 16, and therefore of the retaining plate, to the driven plate.

5. Second 28 and third 30 friction plates coaxially mounted between the drive 16 and driven 20 plates and held in frictional contact with the driven plate and with an intermediate plate 32 in positive engagement with the driven plate.

6. A plurality of torsional or compression springs 34 acting between the drive 16 and retaining 18 plates and the driven plate 20 so as to yield when a slip occurs therebetween.

A consideration of FIGS. 2 and 3 will show that all the listed "plates" of the damper 10 are more or less disclike in shape. The drive plate 16 is shown to have a flange 36 riveted thereto, for connection to the engine flywheel, not shown, as by bolting. The retaining plate 18 is coupled to the drive plate 16 by a series of rivets 38 in annular arrangement. The drive 16 and retaining 18 plates serve in combination as a housing enclosing the various other parts of the damper 10. Each rivet 38 has a greater diameter portion 40 intermediate its opposite ends, which functions as a spacer between the drive 16 and retaining 18 plates.

Lying between the drive 16 and retaining 18 plates, the driven plate 20 has the hub 22 formed centrally thereon for splined connection to the vehicle power train 14. The driven plate 20 has a series of peripheral recesses 42 formed at constant circumferential spacings to permit the rivets 38 to extend therethrough. The dimension of each recess 42 in the direction of rotation of the driven plate 20 is greater than the diameter of the spacer portion 40 of each rivet 38. Thus the driven plate 20 is angularly displaceable relative to the drive 16 and retaining 18 plates within the limits determined by the opposed edges of the driven plate recesses 42.

Figure 4:
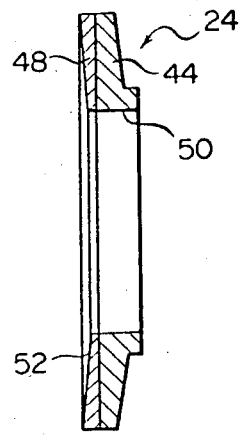
FIG. 4 is an axial sectional view of the first friction plate used in the damper of FIGS. 2 and 3, the first friction plate being shown in its original shape, with the exertion of no spring pressure thereon.
Figure 5:
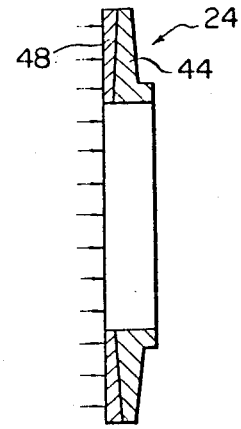
FIG. 5 is a view similar to FIG. 4 but showing the first friction plate in its actual working condition in the damper.
Figure 6:
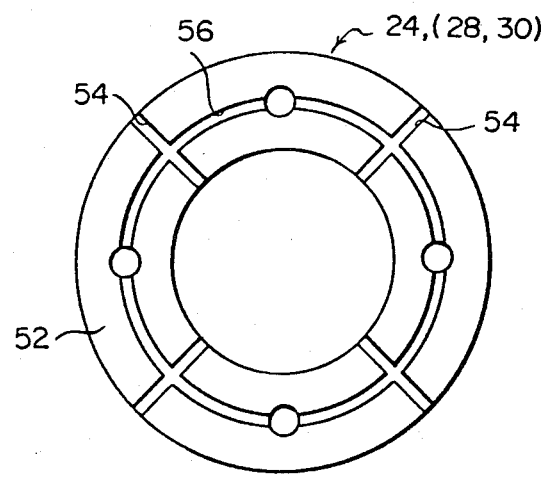
FIG. 6 is an elevational view showing in particular the lubricant grooves in the three friction plates used in the damper of FIGS. 2 and 3.

Next to be referred to, with reference directed also to FIGS. 4, 5 and 6, is the first friction plate 24 which, together with the disc spring 26, constitutes a feature of our invention. The first friction plate 24 comprises a backplate 44 complete with a central boss 46 projecting from one of its opposite surfaces, and a lining 48 covering the other surface of the backplate 44. An axial hole 50 extends through the first friction plate 24 for loosely receiving the hub 22 of the driven plate 20. When mounted in position between the retaining 18 and driven 20 plates, the first friction plate 24 has its lining 48 held against the driven plate under the bias of the disc spring 26.

FIG. 4 shows that, in the absence of the biasing force of the disc spring 26, the first friction plate 24 has a conical contact surface 52. In this particular embodiment the first friction plate lining 48 gradually lessens in thickness from its periphery toward its center in order to provide the conical contact surface 52. The disc spring 26 pushes the central boss 46 of the first friction plate 24 and so urges its conical contact surface 52 against the driven plate 20 under even pressure, as will be seen from FIG. 5.

Another feature of our invention resides in one or more lubricant grooves formed in the contact surface 52 of the first friction plate 24 or of its lining 48. As shown by way of example in FIG. 6, such lubricant grooves may comprise a plurality of radial grooves 54 and at least one annular groove 56, with the latter extending across and in communication with the former. The driven plate hub 22 has formed therein one or more radial lubricant passages 58 for delivering a lubricant to the lubricant grooves 54 and 56. Supplied through the driven plate hub passage 58, the lubricant will flow into the radial grooves 54, and thence into the annular groove 56, in the first friction plate lining 48 thereby lubricating its contact surface 52.

Referring back to FIGS. 2 and 3, the second 28 and third 30 friction plates and the intermediate plate 32 constitute in combination a further feature of our invention. Lying between the drive 16 and intermediate 32 plates, the second friction plate 28 comprises a backplate 60 and a lining 62. The lining 62 covers the backplate surface opposite to the intermediate plate 32 and is held in frictional contact therewith. Lying between the driven 20 and intermediate 32 plates, on the other hand, the third friction plate 32 comprises a backplate 64 and a pair of linings 66 on the opposite surfaces of the backplate. The third friction plate linings 66 are in frictional contact with the driven 20 and intermediate 32 plates.

The intermediate plate 32 has a plurality of pawls 68 projecting radially outwardly therefrom. These pawls 68 are bent right-angularly and engaged in openings 70 formed in the driven plate 20, so that the intermediate plate 32 rotates with the driven plate. Thus the second 28 and third 30 friction plates also act to frictionally transmit the rotation of the drive plate 16 to the driven plate 20, both directly and through the intermediate plate 32.

The linings 62 and 66 of the second 28 and third 30 friction plates have formed therein a lubricant groove or grooves. Such grooves can be identical with the lubricant grooves 54 and 56, FIG. 6, in the first friction plate lining 48. It is therefore understood that FIG. 6 serves also to illustrate the lubricant grooves in the linings 62 and 66. A lubricant is to be supplied to these grooves as through the radial passages 58 in the driven plate hub 22.

Each in the form of a double coil compression spring, the torsional springs 34 are nested in respective rectangular openings 74 formed in the driven plate 20 at constant angular spacings. Each torsional spring 34 projects laterally through windows 76 and 78 formed in the drive 16 and retaining 18 plates. The opposite edges of the drive 16 and retaining 18 plates bounding the windows 76 and 78 move into engagement with the ends of the torsional springs 34 to compress same when a slip occurs between the drive and retaining plates and the driven plate 20.

Shown at 80 in FIGS. 2 and 3 are a plurality of collars disposed at constant angular spacings and extending through the driven plate 20, three friction plates 24, 28 and 30, disc spring 26, and intermediate plate 32. A double-headed pin 82 closely extends through each collar 80, and its opposite headed ends project out of arcuate slots 84 in the drive 16 and retaining 18 plates for joining these plates with a desired degree of tightness. Although not specifically illustrated, it is understood that the double-headed pins 82 together with their collars 80 pass through suitable openings in the noted members to permit the desired relative angular displacement of such members.

While the operation of the damper 10 is believed to be apparent from the foregoing, further amplification will be made in the following brief summary of such operation. The drive 16 and retaining 18 plates transmit the output torque of the vehicle engine to the three friction plates 24, 28 and 30. The first friction plate 24 transmits the engine torque directly to the driven plate 20, and the second 28 and third 30 friction plates transmit the engine torque to the driven plate both directly and through the intermediate plate 32. The driven plate 20 passes the engine torque on to the vehicle power train splined to its hub 22.

In the event of fluctuations in the engine output torque the linings 48, 62 and 66 of the three friction plates 24, 28 and 30 will slip over the driven 20 and intermediate 32 plates, resulting in relative angular displacement between the drive 16 and retaining 18 plates and the driven plate 20. Thereupon the torsional springs 34 will undergo compression to absorb the engine output torque fluctuations.

Figure 7:
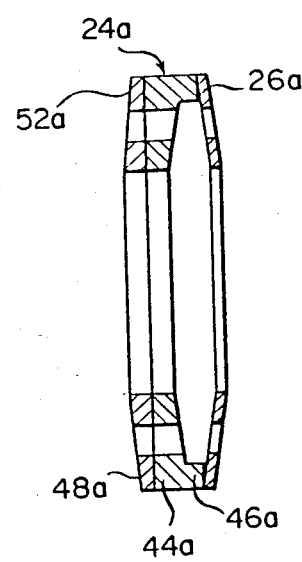
FIG. 7 is an axial sectional view of a modified first friction plate and a modified disc spring, which are also suitable for use in the damper of FIGS. 2 and 3.

FIG. 7 shows a modified combination of first friction plate 24a and disc spring 26a. The modified first friction plate 24a comprises a backplate 44a and a lining 48a. The lining 48a has a contact surface 52a which is cone-shaped when not pressed against the driven plate by the disc spring 26a. The contact surface 52a is convex toward the driven plate, however, unlike the conical contact surface 52 of the friction plate 24 which is concave. The backplate 44a has a peripheral rim 46a projecting therefrom in a direction away from the driven plate.

For use with the modified first friction plate 24a the disc spring 26a is modified to act on its peripheral rim 46a. Thus, when the friction plate 24a and disc spring 26a are mounted in position in the damper 10, the conical contact surface 52a is sprung against the driven plate under even pressure.

Additional modifications and variations of our invention will occur to those skilled in the art without departing from the scope of the appended claims.

We claim:

1. A damper to be interposed between an internal combustion engine and a power train for controlling the torque fluctuations of the engine, comprising:
   (a) a drive plate to be connected to and driven by the engine;
   (b) a retaining plate coaxially connected to the drive plate for simultaneous rotation therewith;
   (c) a driven plate to be connected to the power train for imparting torque thereto, the driven plate being coaxially mounted between the drive plate and the retaining plate for angular displacement within limits;
   (d) means between the drive plate and the driven plate for frictionally transmitting the rotation of the drive plate to the driven plate;
   (e) a friction plate mounted between the retaining plate and the driven plate, the friction plate having a conical contact surface held against the driven plate such that the conical surface becomes flat;
   (f) a disc spring between the retaining plate and the friction plate biasing the conical contact surface of the friction plate to lie flatly against the driven plate under even pressure at all times; and
   (g) spring means operatively connected between the drive and retaining plates and the driven plate for absorbing the torque fluctuations when a slip occurs therebetween.

2. A torque fluctuation damper as recited in claim 1, wherein the contact surface of the friction plate is concave in the absence of the biasing force of the disc spring, and wherein the disc spring acts centrally on the friction plate.

3. A torque fluctuation damper as recited in claim 1, wherein the contact surface of the friction plate is convex in the absence of the biasing force of the disc spring, and wherein the disc spring acts peripherally on the friction plate.

4. A torque fluctuation damper as recited in claims 1, 2 or 3, wherein the contact surface of the friction plate has a lubricant groove formed therein.

5. A torque fluctuation damper as recited in claim 4, wherein the driven plate has a hub formed centrally thereon, and wherein the hub of the driven plate has formed therein a passage for delivering a lubricant to the lubricant groove in the contact surface of the friction plate.

6. A damper to be interposed between an internal combustion engine and a power train for controlling the torque fluctuations of the engine, comprising:
   (a) a drive plate to be connected to and driven by the engine;
   (b) a retaining plate coaxially connected to the drive plate for simultaneous rotation therewith;
   (c) a driven plate to be connected to the power train for imparting torque thereto, the driven plate being coaxially mounted between the drive plate and the retaining plate for angular displacement within limits;
   (d) means between the drive plate and the driven plate for frictionally transmitting the rotation of the drive plate to the driven plate, said means comprising an intermediate plate mounted between the drive plate and the driven plate and rigidly engaged with the driven plate for simultaneous rotation therewith, a second friction plate mounted between the drive plate and the intermediate plate and having a contact surface in frictional contact with the intermediate plate, and a third friction plate mounted between the intermediate plate and the driven plate and having a pair of opposite contact surfaces in frictional contact with the intermediate plate and the driven plate;
   (e) a friction plate mounted between the retaining plate and the driven plate, the friction plate having a conical contact surface held against the driven plate such that the conical surface becomes flat;
   (f) a disc spring between the retaining plate and the friction plate biasing the conical contact surface of the friction plate to be flatly against the driven plate under even pressure at all times; and
   (g) spring means operatively connected between the drive and retaining plates and the driven plate for absorbing the torque fluctuations when a slip occurs therebetween.

7. A torque fluctuation damper as recited in claim 6, wherein the contact surfaces of the second and third friction plates have lubricant grooves formed therein.

8. A torque fluctuation damper as recited in claim 7, wherein the driven plate has a hub formed centrally thereon, and wherein the hub of the driven plate has formed therein a passage for delivering a lubricant to the lubricant grooves in the contact surfaces of the second and third friction plates.

* * * * *